Dec. 14, 1954
A. W. MEYER ET AL
2,696,639
APPARATUS AND A METHOD FOR EXTRUDING AND DRYING PLASTIC MATERIALS
Filed Feb. 8, 1951
2 Sheets-Sheet 1
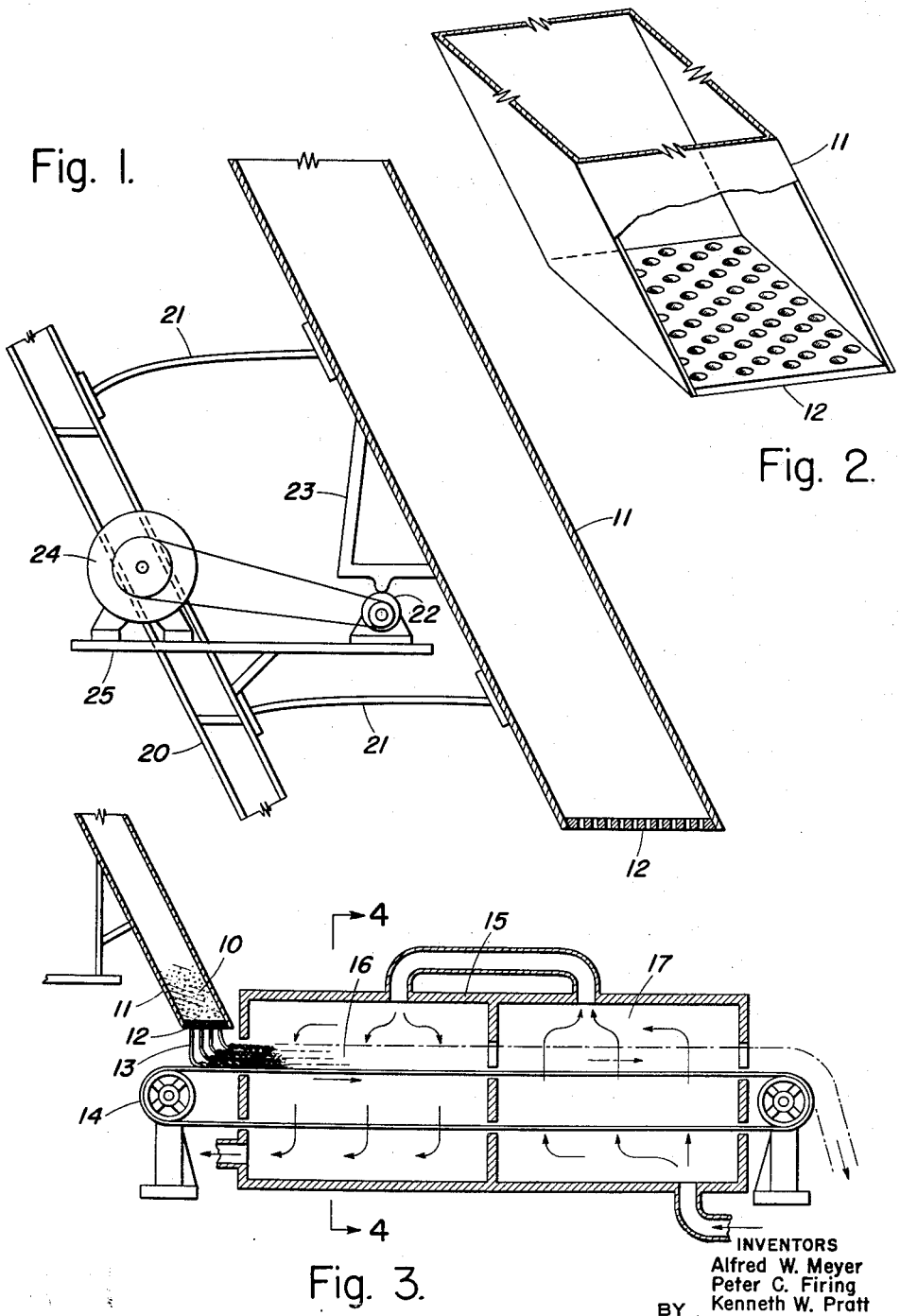
INVENTORS
Alfred W. Meyer
Peter C. Firing
Kenneth W. Pratt
BY
Charles F. Kargeleh
ATTORNEY Dec. 14, 1954     A. W. MEYER ET AL     2,696,639
APPARATUS AND A METHOD FOR EXTRUDING
AND DRYING PLASTIC MATERIALS Filed Feb. 8, 1951     2 Sheets-Sheet 2

INVENTORS
Alfred W. Meyer
Peter C. Firing
BY   Kenneth W. Pratt

Charles F. Kaegebeh
ATTORNEY

United States Patent Office 2,696,639
Patented Dec. 14, 1954

2,696,639

APPARATUS AND A METHOD FOR EXTRUDING AND DRYING PLASTIC MATERIALS

Alfred W. Meyer and Peter C. Firing, Matawan, and Kenneth W. Pratt, Fords, N. J., assignors to National Lead Company, New York, N. Y., a corporation of New Jersey Application February 8, 1951, Serial No. 209,944

4 Claims. (Cl. 18—12)

This invention relates to a device and a method for extruding and drying plastic materials.

Many types of extruding devices have been produced and used for many years. Most such devices however are complex in construction and mechanical operation. In such devices the cost of installation and maintenance are excessive. In many such devices the type of material extruded does not possess the most desirable shape and properties for insuring large throughput through such a device. When such a device is used in a method for drying plastic materials, the extruded material must be of such a nature and possess the necessary characteristics to form an open-structured bed on a drying surface. The bed of plastic material should possess a large surface area to provide maximum direct contact with the drying gases which are passed through the bed. In drying plastic materials discharged from most extruding devices no provision is provided to form such an open-structured bed in order to promote rapid drying of the moist material. When such materials are extruded by most types of extruding devices, the extruded material falls onto a conveyor in random fashion and forms lumpy, compact masses which are then subjected to the action of drying gases to remove the moisture from the extruded material. These compact masses are difficult to dry since the surface area of such masses is relatively small in comparison to the bulk of material to be dried. Drying such material involves extended periods of time to remove the moisture from the inner portion of such masses.

An object of this invention therefore is to provide an apparatus for extruding plastic materials which is simple in construction and mechanical operation. A further object is to provide an apparatus for the extrusion of plastic materials into the form of a substantially continuous string or a plurality of such strings. Another object is to provide an apparatus which is economical to maintain in operation. Another object is to provide a bed of extruded material which possesses an open structure. Another object is to provide a bed of extruded plastic material which may be more readily and efficiently dried by passing drying gases therethrough. A still further object is to provide an improved method for extruding and drying plastic materials by forming an open-structured bed and passing drying gases through said bed. These and other objects will become apparent from the following complete description of the invention and the annexed drawings in which:

Fig. 1 illustrates a side view partly in section of the extrusion apparatus.

Fig. 2 illustrates a detail of the bottom portion of the apparatus of Fig. 1.

Fig. 3 illustrates the apparatus as employed in the drying process.

Figure 4:
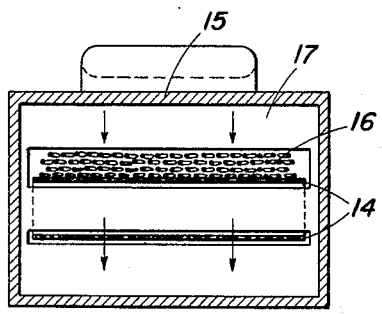
Fig. 4 is a section view of the apparatus shown in Fig. 3 taken along the line 4—4.

In order to describe the apparatus for extruding plastic materials, Fig. 1 is presented to show the preferred type of apparatus contemplated by the present invention.

Referring now to Fig. 1 the extruding device is composed of a chute 11 having a perforated bottom portion 12. The chute is held in a generally upstanding position by mounting means including a stationary support 20 and resilient leaf springs 21 connecting said chute with said stationary support. The chute 11 is vibrated in a generally upward and downward reciprocal motion by vibrating means including oscillating device 22 operating against bracket 23. The oscillating means is driven by motor 24 mounted on support 25. During operation of the device the plastic material to be extruded is fed into the chute at the top and drops to the bottom of the chute. Through vibrating upward and downward reciprocal motion the plastic material in the bottom portion of the chute is extruded by gravity through the perforations 12. Fig. 2 shows the perforated plate in more detail by the perspective drawing of the bottom of the chute partially cut out.

In carrying out the extrusion of plastic materials by such a device, the plastic material is added to the top of the chute and slides to the bottom of the chute. The material is continuously extruded through the perforations at the bottom of the chute by vibrating the chute in upward and downward reciprocal motion. The material extruded from the apparatus comprises a plurality of substantially continuous strings of said plastic material.

By the term "plastic material" is meant substances which are pliable or capable of being molded or extruded into various shapes or forms. This apparatus is particularly successful employed for extruding plastic materials such as those which are inherently thixotropic in nature, for example, pigment cakes, i.e. titanium dioxide pigment cake.

This invention further contemplates a mass of extruded plastic material in the form of an open-structured, porous bed, adapted to be dried by the passage of drying gases therethrough, comprising a plurality of substantially continuous meanderous strings of said plastic material. The plurality of continuous meanderous strings which form the bed preferably should lie side by side and in superposed rows which should be built up to form a bed of several layers thickness. The strings in the rows in said bed preferably should lie in staggered superposed position with one another. It is preferred to have the strings in the open-structured, porous bed all of substantially uniform thickness in order to obtain a more uniform structure throughout the porous bed. The porous bed formed in this manner by a plurality of meanderous strings provides for a maximum amount of surface area to be exposed to the drying gases which pass through the bed during the drying operation. This large surface area provides for rapid drying of the moist material.

In order to produce such an open-structured bed of the type described above, this invention further contemplates a method for producing the same. The method preferably utilizes the type of extruding apparatus previously described. The method broadly comprises extruding plastic material into a plurality of substantially continuous strings, arranging said strings in a meandering pattern to form a porous bed, and passing drying gases through said bed to dry said material.

The method of extruding and drying the plastic material may be described in more detail by reference to the drawing of a preferred embodiment of the present invention as shown in Fig. 3. Referring now to Fig. 3, plastic material 10 is placed in an extruder chute 11, and is extruded through perforations 12 at the bottom of chute 11. The extruded material 13 is collected on conveyor 14 which passes through drying chamber 15. The extruded material builds up on the conveyor to form a porous open-structured bed 16 which is dried by passing drying gases 17 through said bed as the material passes through the drying chamber 15.

In order to arrange the continuous strings in a meanderous form in the open-structured bed, it is preferred to extrude the plastic material at a rate which exceeds the rate of movement of the drier conveyor. The extruded material therefore is lowered onto the conveyor and forms a meanderous pattern on the conveyor as the bed is built up.

It is also desirable to place the perforated plate in the bottom of the extruder substantially parallel to the surface of the conveyor in order to obtain more uniform arrangement of the continuous strings in forming the open-structured bed.

A cross-section of the bed lying on the conveyor in the drying chamber is shown in Fig. 4. It should be noted that the strings in the bed lie side by side in staggered superposed rows which arrangement produces a large surface area exposed to the drying gases passing therethrough.

It is desirable to have substantially uniform thickness of all of the strings in the bed in order to produce maximum surface area. One such method of accomplishing uniform string thickness is to employ the perforated plate shown in Fig. 5 which is placed at the bottom of the extruder chute. This plate comprises a series of perforations nearer one side of the plate having greater diameter than others nearer the opposite side of the plate. The plate is placed in the chute in position relative to the conveyor in the drying apparatus so that the smallest perforations 12a are positioned in advance of the largest perforations 12b with respect to the movement of the conveyor, i. e. the smallest perforations are nearer to the discharge end of the conveyor than the largest perforations. This particular type of plate is shown in operating position in Fig. 6 in which the smallest perforations 12a are positioned in advance of the largest perforations 12b with respect to the movement of conveyor 14. Fig. 6 is an enlarged drawing in cross-section of part of the apparatus shown in Fig. 3.

In operating the apparatus as shown in Fig. 6 the material 10 to be extruded is extruded through perforations 12 at the bottom of chute 11 and the extruded material 13 (i. e. the continuous strings) which passes through perforation 12b (the largest perforation) falls on the conveyor and forms the bottom layer of the porous bed 16. The strings formed by perforation 12a (the smallest perforation) form the top layer of the porous bed. As the material hangs from the perforations it becomes thinner in diameter the further it is lowered from the perforations. In order to obtain uniform thickness of the strings in the porous bed it is necessary to provide different size perforations for the various distances which the strings are lowered. The perforation size therefore is adjusted to compensate for the variations in the distances the strings are lowered to reach the newly-formed bed. As shown in Fig. 6 the perforation 12b is largest because the length of travel to reach the conveyor to form the bottom layer in the porous bed is longest, while the perforation 12a is smallest since the length of travel to reach the newly-formed bed to form the top layer is shortest. The variation of perforation sizes in the plate at the bottom of the chute compensates for the diameter variations due to tension on the hanging strings, and therefore uniform diameter of strings may be obtained in the porous bed by this type of plate even though the material does "thin out" as the hanging length is increased.

Figure 5:
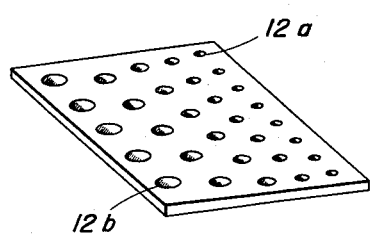
Fig. 5 shows a detail of the preferred arrangement of the perforations in the bottom portion of the apparatus of Fig. 1.
Figure 6:
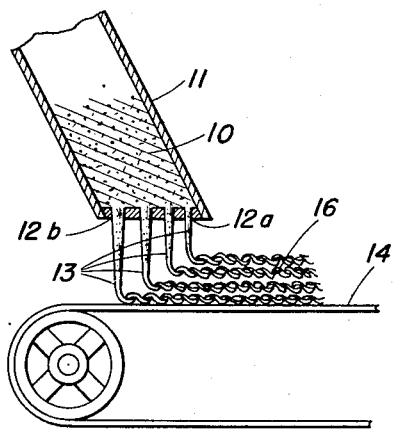
Fig. 6 illustrates the effect obtained by employment of the type of perforations shown in Fig. 5.

It should also be noted that the perforations in the plate shown in Fig. 5 are arranged in rows and in each succeeding row the perforations are staggered with respect to the preceding row. This staggered effect produces a porous bed on the conveyor in which each succeeding layer of strings lie in staggered superposed relationship with one another.

Figure 7:
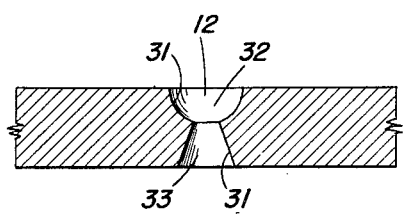
Fig. 7 illustrates in cross-section a portion of the bottom plate of the extrusion apparatus showing a preferred form of perforation configuration.

Another preferred embodiment of the perforated plate at the bottom of the chute in the extruding device is shown in Fig. 7. Fig. 7 shows the perforated plate in cross-section and illustrates a type of perforation which has been proven to be highly efficient in extruding plastic materials. This type of perforation in the bottom plate of the extruded chute has sidewalls which are concave in the upper portion of said perforation and outwardly tapering in the lower portion of said perforation.

A highly efficient extruding device has been described by the instant invention which is simple in construction and economical to operate and maintain. A porous, open-structured bed of plastic material having a large surface area has been described in detail. The type of bed produced by the instant invention may be more readily and efficiently dried by passing drying gases therethrough than any that have heretofore been known.

In drying plastic materials by employing the method described in the instant invention, it has been found that the bed formed by such a method is readily dried and that the throughput of material is substantially increased. By employing the extruding device the extruded material forms continuous strings, not short pieces of strings which are normally formed by most extruders. Using the process of forming a bed several layers in thickness by forming a meandering pattern of the continuous strings, a porous bed having a maximum surface area is obtained which is capable of being readily dried.

While this invention has been described and illustrated by the examples shown, it is not intended to be strictly limited thereto and other modifications and variations may be employed within the scope of the following claims.

We claim:
1. Apparatus for extruding and drying plastic material in the form of self-sustaining strings of unbroken length comprising in combination: a conveyor belt; means arranged to move said conveyor belt in a substantially horizontal plane; a material containing chute having an integral perforated bottom; chute supporting means comprising resilient elements arranged to support said chute with its major axis at an acute angle to a vertical plane and its perforated bottom in a substantially horizontal plane spaced vertically above the plane of said conveyor belt; vibration means arranged to vibrate said resiliently supported chute in an upward and downward reciprocal motion in the direction of the major axis of said chute to expel the material therein through the perforations in the bottom thereof, the disposition of the perforations in the bottom of said chute being so constructed and arranged with relation to said moving belt as to attenuate the material being expelled through said perforations to form and lay down on said moving belt self-sustaining strings of material of continuous unbroken length.

2. Apparatus according to claim 1 in which the upper portions of the sidewalls of the perforations are concave while the lower portions of the side walls of said perforations are tapered outwardly and downwardly.

3. Apparatus according to claim 1 in which the perforated bottom of said chute comprises a plate having a plurality of rows of perforations, the perforations of juxtaposed rows being arranged in staggered relationship and the perforations in successive rows decreasing in size in the direction of movement of said conveyor belt.

4. Method for drying plastic material which comprises extruding said material in the form of continuous self-sustaining strings of unbroken length onto a continuously moving belt while simultaneously imparting reciprocable motion to said continuous strings in a direction at an obtuse angle with respect to the plane of said moving belt, thereby to impart a spiral motion to said self-sustaining strings so as to lay down said self-sustaining strings in the form of overlapping spirals to produce a porous bed of spiralled strings, and passing a drying gas through the porous bed of spiralled strings.

References Cited in the file of this patent

UNITED STATES PATENTS

| Number | Name | Date |
| --- | --- | --- |
| 1,433,045 | Tabourin | Oct. 24, 1922 |
| 1,774,896 | Miller | Sept. 2, 1930 |
| 1,843,184 | Wyatt et al. | Feb. 2, 1932 |
| 1,980,898 | Abernethy | Nov. 13, 1934 |
| 2,095,252 | Hermann | Oct. 12, 1937 |
| 2,339,979 | Clarke | Jan. 25, 1944 |
| 2,353,492 | O'Connor | July 11, 1944 |
| 2,540,092 | Brassert | Feb. 6, 1951 |

FOREIGN PATENTS

| Number | Country | Date |
| --- | --- | --- |
| 5,372 | Great Britain | Apr. 28, 1900 |